April 25, 1961 R. BELLINGER ET AL 2,981,422
CHARGING AND DISCHARGING MACHINES
Filed Nov. 29, 1957 10 Sheets-Sheet 5

April 25, 1961  R. BELLINGER ET AL  2,981,422
CHARGING AND DISCHARGING MACHINES
Filed Nov. 29, 1957  10 Sheets-Sheet 7

United States Patent Office 2,981,422
Patented Apr. 25, 1961

2,981,422
CHARGING AND DISCHARGING MACHINES

Ronald Bellinger, Ernest James Hutchinson, and William Henry Shipley, Bristol, England, assignors to Strachan & Henshaw Limited, Bristol, England, a company of Great Britain and Northern Ireland Filed Nov. 29, 1957, Ser. No. 699,854

Claims priority, application Great Britain Nov. 30, 1956

20 Claims. (Cl. 214—18)

This invention relates to apparatus for charging and/or discharging a vessel and in particular to apparatus for use with a vessel requiring to be charged and/or discharged with a charge which cannot be manually handled.

According to the present invention we provide apparatus for charging and/or discharging a vessel comprising a chamber having an outlet adapted to be connected to said vessel, storage means in said chamber for charge material to be charged into or discharged from said vessel, hoist means within said chamber provided with charge engaging means for engaging and releasing said charge material and control means externally of said chamber for controlling said hoist means and said charge engaging means.

The apparatus for charging and discharging a vessel may comprise a gas tight pressurable chamber adapted to be connected to said vessel, storage means in said chamber for a charging chute and charge material to be charged into and removed from said vessel, two independent hoist means within said chamber adapted to operate on the same line of hoist and provided with engaging means for engaging and releasing said chute and charge material respectively, control means externally of said chamber for controlling said hoist means and said engaging and releasing means and means whereby one said hoist means is movable out of the path of the other. The hoist means may be mounted on a removable portion of the wall of said chamber. The hoist means may be disposed one above the other, the lower being pivotally mounted so as to be movable out of the path of the upper, or may be adapted to operate on different lines, hoist cable displacing means being provided for at least one hoist to enable said hoist to operate on alternative lines at will. The upper hoist may serve for handling the chute required where a number of passages have to be serviced through a single opening, the other being reserved for the handling of charges. Separate storage compartments may be provided for new and old charges. Means may be provided for pressurizing the chamber to match the pressure in the vessel to be serviced and cooling means provided for the removal of surplus heat given off by the irradiated charges. In order that the position of any mechanism may be ascertained at any instant position indicating means may be provided. The turn cable includes chains, flexible tubes, ropes or any suitable load carrying means.

Referring to the drawings filed herewith:

Fig. 17 is a fragmentary section on the line XVII—XVII of Fig. 7 showing details of the traversing drive for the element hoist barrel illustrated in Fig. 7 modified to receive a hollow flexible gastight cable for a gas operated element grab in place of the electric cable shown in Fig. 7 for an electrically operated grab;

In the form shown in Figs. 1 to 6 of the drawings the apparatus is designed for the handling of fuel elements, control rods and plugs in the charging and/or discharging or changing the radio-active fuel elements in the channels of a reactor core whilst under pressure and in operation, so that the reactor does not have to be shut down in order to change the fuel or recover an element which is exhausted or has become faulty. A mild steel tubular body 2 of oval cross section constituting the pressure chamber is encased in a series of cast iron sleeves 4 which in turn are enclosed in a biological shield made up of concrete filled steel sleeves 6 having stepped joint faces 8. Intermediately of its length at a position which will be approximately level with the centre of gravity of the structure, the body 2 is provided with a thickened portion 10 by which it is adapted to be mounted, being secured to a frame 12 of massive fabricated construction carried on four bogies 14 each having two cast steel flanged wheels 16 running in roller bearing axle boxes (not shown). Two wheels 16' of the assembly are fitted with cast steel spur rings 18 engaged by pinions 19 of a driving unit of which the train of reduction gears and casing 20 are diagrammatically indicated in Fig. 1. The drive is effected by a main motor 21 and creep motor 22 designed to give a normal speed of 20 ft. per minute and a creep speed of 6 ins. per minute. The wheels 16 and 16' run on rails 23 carried on the framework 24 of a gantry.

Figure 1:
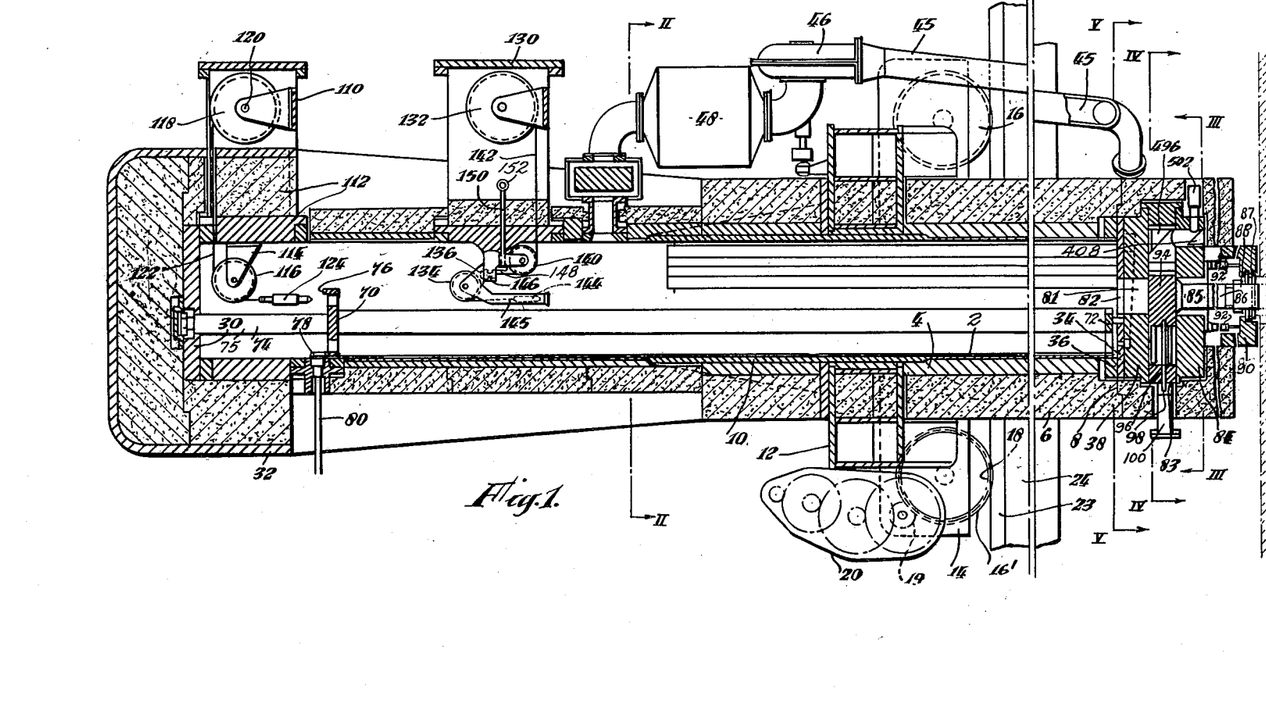
Fig. 1 is a longitudinal section of one form of apparatus made in accordance with the present invention.
Figure 2:
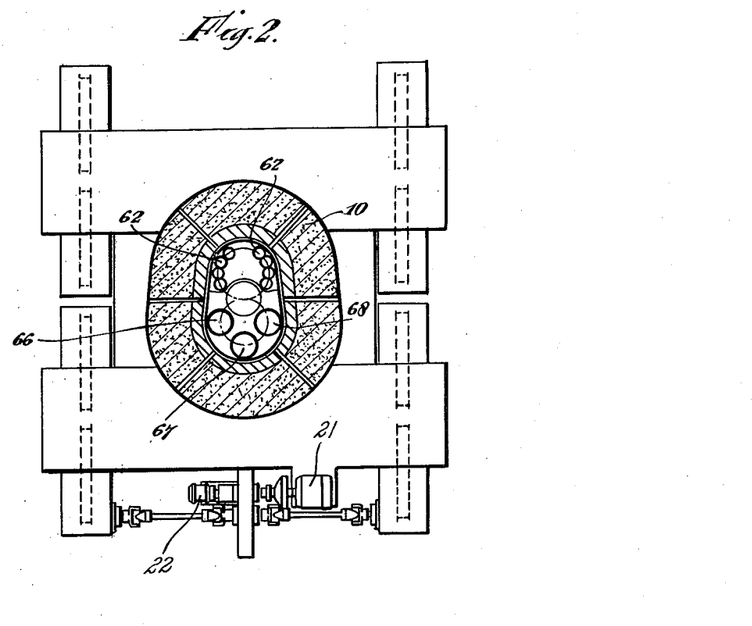
Fig. 2 is a transverse section on the line II—II of Fig. 1.

The top of the body 2 is closed by a cover 30 and a protective cap 32 constructed of steel and concrete. The base is closed by a plate 34 the flange 36 of which is welded thereto. Secured beneath the base plate 34 is a manifold 38 (Fig. 5) having a channel 40 the ends of which are adapted to be coupled by elbows 44 of a system of pipes 45 connecting with a centrifugal circulator 46 which has its inlet coupled via a heat exchanger 48 to the side and at the upper end of the body 2. Eight holes 50 through the base plate 34 are formed with valve seating 52 engaged by valves 54 (Fig. 6) having a stem 55 and a tubular head extension 56 engaged with a sleeve 58 carried on a valve rod 60 the valve rod 60 and sleeves 58 being mounted in the manifold 38. Valve springs 61 urge the valve 54 onto its seating. Mounted within the body 2 and above each of the eight holes 50 are tubes 62 arranged in two groups of four each tube being long enough to hold eight charges or elements so that the bottom element engages the stem 55 of the valve 54 and has sufficient weight to open it against the pressure of the valve spring 61 which it will be noted is totally enclosed partly within the valve head extension 56 and partly within the sleeve 58. When the valve 54 is opened and the centrifugal circulator 36 is operating the respective tube 62 will be placed in circuit with the $CO_2$ coolant contained in the body 2 and system of pipes 45. It will be observed that the tubes 62 are arranged in two arcs about a centre 64 displaced laterally with respect to the centre-line of the oval body 2. Similarly laterally displaced and on the opposite side of the oval body 2 are three tubes 66, 67 and 68 also arranged equidistantly from a centre, the said tubes being mounted in and between a top bracket 70 and a bottom bracket 72 carried on a shaft 74, the ends of which are journalled in the top plate 30 and bottom plate 34 respectively, the brackets 70 and 72 and shaft 74 constituting a turret 75. Two of said tubes are destined for new and old plug storage respectively and the third for chute storage. The top bracket 70 is provided with teeth 76 extending only a part of the way round and engaged by a bevel pinion 78 on a shaft 80 so that rotation of the said shaft 80 will turn the turret 75 to enable one of the tubes 66, 67 or 68 to be brought into co-axial relation with the centre line of the oval body 2. The centre of the plate 34 and manifold 38 are pierced with a hole 81 and 82 respectively. Beneath the manifold 38 is secured a valve box 83 closed by the cover 84 which has a central hole in which is secured a tube 85 within which is slidably mounted a second tube 86 so as to telescope therein and to the lower end of the tube 86 is secured a flexible coupling 88 adapted to be located on the inlet of a headbox or standpipe mounted in the casing of the reactor (not shown). The lower end of the tube 86 is secured in a plate 87, carried in a steel shielding block 90 slidably mounted in the bottom of the protective covering for the body 2 and is adapted to be raised by lifting cylinders 92. The hole 83 is adapted to be closed by a slide valve 94 connected by piston rod 96 to a piston 98 in a cylinder 100.

In order that the precise position of the grabs 124 and 144 may be known at all times, the shafts of the drums 118 and 132 are coupled to remote actuating indicators known by the trade name "Desynn" (not shown) which give indications on dials on a control panel located in a control room. The construction and use of such indicators are well known and will not be described here as they form no part of the present invention except insofar as remote indicators of some form are virtually essential for the operation of the apparatus by remote control.

Mounted in the side of the body 2 near the top is a removable housing 110 provided with suitable steel and concrete protection 112, said steel protection carrying a bracket 114 in which is journalled the shaft of a stainless steel head pulley 116. Outside the protection but within the housing 110 is a winding drum 118 the shaft 120 of which is carried outside the housing to a motor (not shown). A cable 122 from the winding drum 118 passes over the head pulley 116 and carries at its end a service grab 124 movable on the centre line of the body 2 and adapted to be lowered through the hole 82. Beneath the housing 110 is a similar housing 130 fitted with winding drum 132 but instead of a single fixed head pulley there is head pulley 134 carried on a bracket 136 pivotally mounted so that the pulley 134 and bracket 136 can be swung clear to allow the passage of the grab 124. Beneath the bracket 136 is mounted a guide pulley 140 for the rope 142, the free end of which carries the element grab 144 shown in Fig. 1 disposed within a housing 145 carried by the pivoted bracket 136. The pivot of the bracket 136 is provided with a bevel gear 146 which is engaged by a bevel gear 148 on a shaft 150 which in turn is adapted to be rotated by a pair of bevels one of which is carried by a shaft 152 which passes through the housing 130. Rotation of the shaft 150 will enable the housing 145 to be located over any one of the tubes 62 so that the element grab can enter such tube for the delivery thereto or extraction therefrom of an element. The grabs which form the subject matter of a co-pending application may be electrically operated, for example by a solenoid fed with direct current.

In operation and starting with the assumption that the apparatus has been charged with 32 new elements contained in four of the tubes and that the other group of four tubes 62 are empty for the reception of used elements and that the necessary connection has been made to a standpipe of the reactor, the procedure for changing the elements is as follows:

(1) The chute and plug storage turret is rotated by the shaft 80 so that an empty plug storage tube is over the hole 82 and beneath the service grab 124.

(2) The drum 118 of the service grab hoist is then operated to lower the service grab 124 until it engages with the lifting attachment on the plug.

(3) The plug is then supported within the tube 68 into which it has been raised by the service grab and the turret again rotated to bring the tube 68 containing the chute onto the centre line of the chamber.

(4) The service grab is again lowered and engaged with the chute which on being released from its mounting in the tube 68 is lowered through the charge tube until the bottom of the chute rests in the channel of the reactor immediately below the charge tube.

(5) The grab is released and hoisted to the fully hoisted position at the top of the chamber 2.

(6) The element grab hoist is swivelled to bring the grab 144 to the central position and the grab 144 lowered. For every channel except the central channel having zeroed the height indicator (which may be for example a Magslip) the grab is positioned at chute radiusing level and the chute radiused until the height indicator shows that it is over the selected channel.

(7) The grab is lowered to engage with the top element and rehoisted to chute radiusing level.

(8) The chute is closed.

(9) The grab with element is then raised into the chamber 2 and swivelled over an empty tube 62 into which the used element is lowered and released where it remains and is cooled by the $CO_2$ circulating system.

The above operation is repeated until all the elements in a channel are removed and stored.

New fuel elements can now be taken one by one from one of the tubes 62 and loaded into the reactor, the operation being so similar to the unloading operation above described that no further description is necessary.

After the last element has been inserted the element grab and chute are withdrawn, the plug replaced or a new plug substituted and the apparatus disconnected for reloading with fresh elements and removal of the used elements ready for re-use. The position of the grabs 124 and 144 can be determined at all times by the readings on the dials of their associated Magslip indicators. Various electrical devices including contacts and indicators for part of the apparatus for the purpose of indicating the condition of the grabs and chute so that by such means it is possible to tell from the control panel whether the grab being used has effectively engaged with or disengaged from the element, plug or chute being handled. Such obviously essential ancillary indicating equipment for remote control is well known and therefore not described here as they form no part of the present invention.

In operation after the apparatus has been moved into position and secured to the standpipe in gastight manner the chamber is pressurised. The opening of the valve will pressurise the interior of the body 2. Alternatively, separate means may be provided for pressurising the body before opening the valve.

With the apparatus above described the changing of the fuel can be carried out without the necessity of taking the reactor off load.

Turning now to Figs. 7 to 20, the apparatus shown closely resembles the one first described with reference to Figs. 1 to 6 and the same numbers have been used to indicate the same parts where applicable.

The first modification to be noted is that a pressure chamber 300 of cylindrical cross section has been substituted for the oval shaped pressure chamber 2. This change has many obvious advantages, the chief of which is ease of manufacture. The change, however, has necessitated other modifications such as an alteration in the arrangement of the element and service hoists and of the storage tubes for the chute and plugs and elements.

In this arrangement the turret comprises a central tube 320 suspended from the top on a roller thrust bearing 322 mounted in a thick diaphragm 324 secured in the upper part of the cylindrical body 300 and also serving as a shield beneath the element and service hoists to be hereafter described. The top of the tube 320 carries a bevel gear 326 which is engaged by another bevel gear 328 on a shaft 330, coupled by shafts and gears (not shown) enclosed in the housing 332 to the turret turning motor 334. Returning to the construction of the turret, the tube 320 is journalled at its lower end in a ball bearing 336 carried on a diaphragm 337 secured within the hollow cylindrical body 300. Secured to the central tube 320 above the bearing 336 is a fabricated turret base member 338 in which the lower ends of the element storage tubes 62 and the plug or chute tubes 66, 67 and 68 are secured. It will be noted that in addition to two groups of three element storage tubes 62 each group has three element and grab guide tubes 340 for guiding the element and grab and these also are secured at their lower ends in the base member 338, but instead of being closed thereby they pass through the base member 338 and are open at their bottom ends. The element storage tubes 62 are closed at the bottom by the base member 338. All these tubes are supported intermediately from the central tube 320 by a number of diaphragms 342 of which only two are shown, but any convenient number may be provided. It will be noted that each element storage tube 62 and its radially associated guide tube 340 are connected together at their upper ends to a common header tube 344 the function of which is to steady the grab and element whilst being transferred from the guide tube 340 to the storage tube 62 or vice-versa. The header tubes 344 stop short of the chute and plug tubes 66, 67 and 68 which continue up and are secured near their open upper ends in a top diaphragm 346 located immediately beneath the diaphragm 324.

Mounted within the hollow cylindrical body 300 (Figs. 7 to 11) near the top thereof and suitably secured in position is a flange plate 352 which carries brackets 354, 356 and 358. Mounted in bearings in the brackets 354 and 355 (Fig. 17) is the winding barrel 360 for the element grab cable rope 142 on the free end of which is carried the element grab 144, the rope 142 passing over the head pulley 134 carried in bearings in the bracket 358. The element hoist motor 362 (Fig. 8) is coupled via the reduction drive and brake enclosed in the housing 364, the mountings of which are not shown, to one end of the shaft 366 of the barrel 360 the other end of which shaft 366 is coupled to the shaft of a slip ring device enclosed in the housing 368 to which the ends of the conductors (not shown) in the cable rope 142 are connected, the said conductors serving for the supply of current for the operation of the grab 144 if of the electrically operated type and/or of indicator circuits for determining whether the grab is in the open or closed condition.

Turning now to Fig. 17, this shows the barrel 360 in section and drawn to an enlarged scale. It will be seen that the barrel 360 is formed as a hollow cylinder closed at one end by the flange 370 secured to a sleeve 372. The sleeve 372 is in turn slidably supported on the barrel shaft 366 by three crossed roller chains having rollers 374 (Fig. 18), said chains being equally spaced around the shaft 366. The shaft 366 and sleeve 372 are provided with longitudinal V shaped grooves 376 and 378 respectively. The rollers in each chain are arranged along the chain with their axes alternating by 90° so that in one direction the torque is transmitted from shaft to barrel by one set of alternate rollers and in the reverse direction by the other set of alternate rollers. In this way the barrel 360 must rotate with the shaft but is free to slide along it. The sleeve 372 is provided at its outer end with a cam follower roller 380 (Fig. 17). A cam sleeve 382 carried on spaced bearings 384 is supported so as to rotate freely on the barrel shaft 366. The cam sleeve 382 is provided with an internal helical cam groove 386 which makes approximately two turns in the length of said sleeve. At the same end as the bearings 384 the sleeve 382 is provided with an internally toothed gear 388. The barrel shaft 366 is supported near its ends in bearings 390 and 392 carried in brackets 354 and 355 respectively mounted on the diaphragm plate 352 as already described. Mounted in bearings 394 in the brackets 355 is the double pinion 396 one gear of which is in mesh with the internally toothed gear 388, and the other with a pinion 398 mounted on and keyed to the barrel shaft 366. The shaft 366 carries one member of a flexible coupling 400, the other member of which is carried on the end of the output shaft 402 of the reduction gear contained in the housing 364. As the shaft 402 rotates and drives the barrel shaft 366 through the flexible coupling the gears 398, 396 and 388 rotate the cam sleeve 382 at a differential speed causing the cam follower roller 380 to move along the cam groove 386 and traverse the barrel 360 along the barrel shaft 366. The barrel 360 is provided on its periphery with a helical rope groove 404 which makes approximately 19 turns thereon. The traversing movement of the barrel keeps the rope lead of rope 142 from barrel 360 to head pulley 134 substantially constant and at a minimum.

Mounted near the top of the cylindrical body 300 is the gas operated element deflector 406 (Fig. 7) horizontally disposed above the header tube 344 and fitted with a roller 408 the purpose of which is to engage the rope 142 of the element grab 144 so as to deflect the grab 144 from directly over the element storage tube 62 into line with its radially related guide tube 340. The deflector 406 remains extended the whole time that the grab 144 is within the guide tube 340 in order to prevent the rope 142 from rubbing on the side of the tube 340. Just above the deflector 406 is a gas operated cylinder 410 mounted horizontally in the cylindrical body 300.

Figure 19:
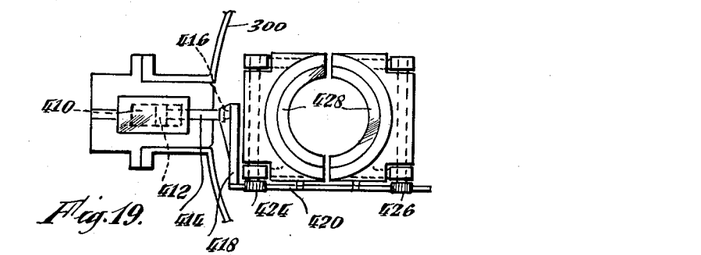
Fig. 19 is a diagrammatic elevation of a gas operated latch mechanism.
Figure 20:
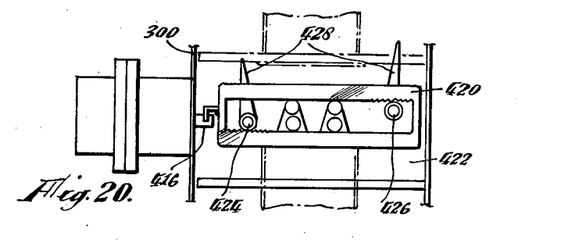
Fig. 20 is a plan view of the mechanism shown in Fig. 19.

Turning now to Figs. 19 and 20, the piston 412 in the cylinder 410 has a piston rod 414 on the end of which is a fork 416 which is adapted to be projected into the cylindrical body 300 and to engage an arm 418 carried on a slidable rack member 420 carried in a housing 422 one of which is secured to the side of each of the tubes 66, 67 and 68. This fork and arm engagement allows the parts to be disengaged for rotation. It will be seen that the rack member has two short lengths of teeth at opposite ends and sides thereof which engage gears 424 and 426 on their opposite sides respectively journalled in said housing 422. Movement of the rack will therefore rotate the said gears in opposite directions. Carried on the shafts of the said gears are gate members 428 located within the tube 66, 67 or 68. These gate or latch members are normally horizontally disposed to obstruct the tube, but when said rack member is operated the gate is opened. Similar mechanism is provided at the bottom of the said tubes 66, 67 and 68 actuated by the gas operated cylinder 430 (Fig. 17).

Figure 12:
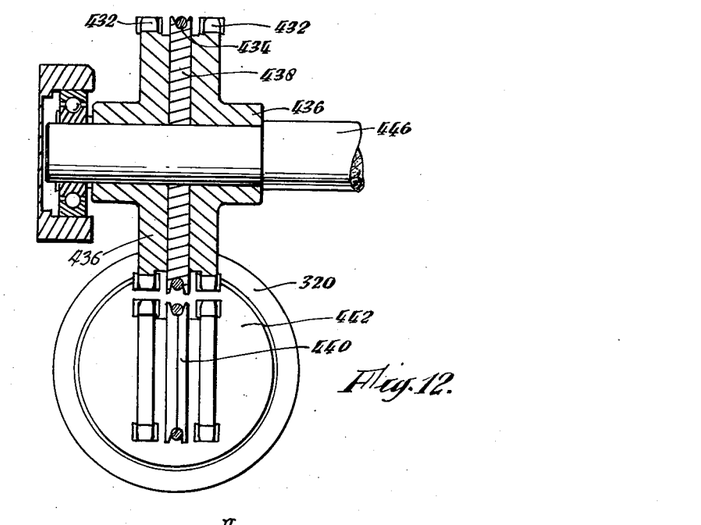
Fig. 12 is a fragmentary horizontal section through the service hoist shaft shown in Fig. 7 to show details of the drive. Apart from a fragmentary indication of the pressure vessel all other features have been omitted for the sake of clarity.
Figure 13:
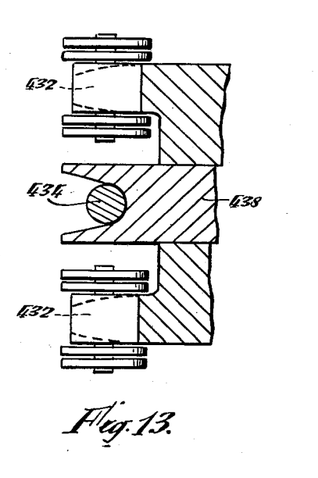
Fig. 13 is a fragmentary section to an enlarged scale of the service hoist chain and cable sprocket shown in Fig. 12.
Figure 14:
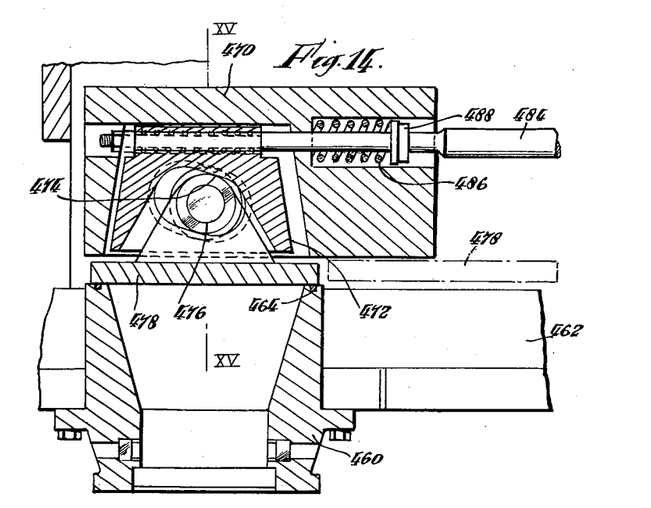
Fig. 14 is a fragmentary longitudinal sectional view showing to an enlarged scale and in greater detail the construction of the valve, valve shuttle, valve plate and adaptor flange illustrated in Fig. 7.
Figure 15:
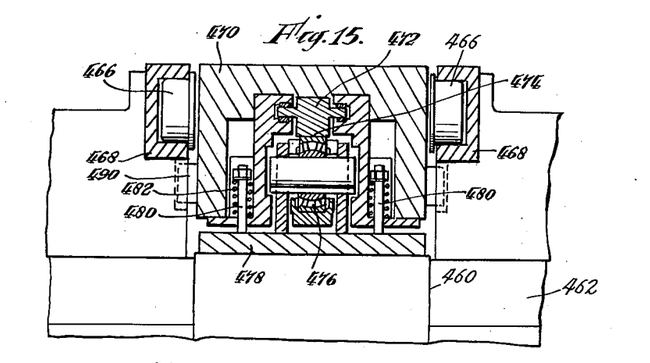
Fig. 15 is a section on the line XV—XV of Fig. 14.
Figure 16:
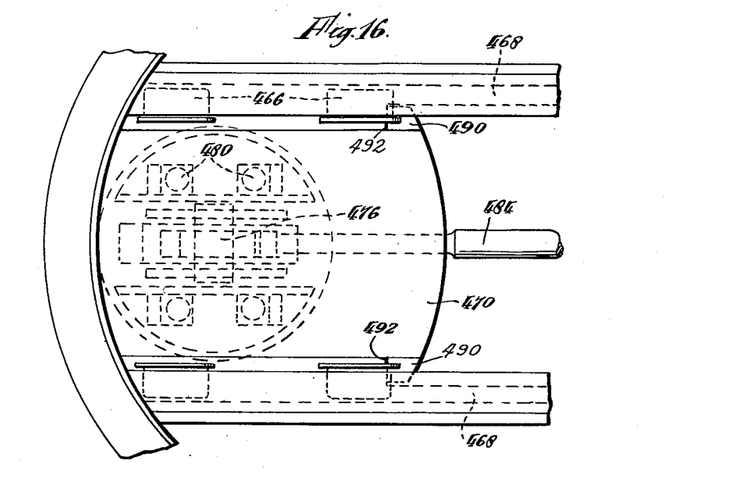
Fig. 16 is a fragmentary plan view of Fig. 14 purposely incomplete and intended only to indicate the relevant position in plan view of the more important parts of the valve mechanism shown in Figs. 14 and 15.
Figure 18:
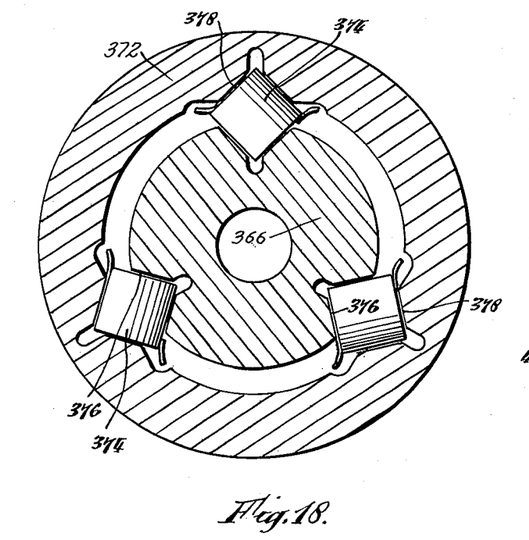
Fig. 18 is a section on the line XVIII—XVIII of Fig. 17.

The service grab 124 in the present arrangement is differently suspended as will be seen in greater detail in Fig. 12. Instead of a rope and barrel arrangement the grab 124 is suspended on two parallel roller chains 432 spaced sufficiently apart to accommodate between them an electric cable or flexible pipe 434 according to whether an electric or gas operated grab is used. The head pulley comprises two chain sprockets 436 in spaced relation mounted on each side of a grooved pulley 438 (Figs. 12 and 13). After passing over the head pulley the chains and cable pass down the central tube 320 of the turret and pass beneath and around a second smaller bottom pulley 440 from which is suspended a weight 442. The two chains then pass up the central tube 320 and their ends are secured in a suitable anchorage on plate 352 above the top of the tube 320. The cable 434 is of course carried out to a suitable connector (not shown). Instead of being free as in the previous construction, the head pulley sprockets 436 are driven. The head pulley shaft 446 (Fig. 8) is connected by coupling 448 to the output shaft from a reduction gear in the housing 450 which reduction gear is driven by the hoist motor 452. It will be obvious that one of the advantages of the chain arrangement is that there is no tendency for the grab to spin when the load is changed as in the case with most ropes.

Located at the base of the cylindrical body 300 is a valve which is of modified construction and comprises an adaptor flange 460 (Figs. 14, 15 and 16) mounted in the pressure vessel end plate 462 grooved at the top to receive an O ring 464. Mounted on rollers 466 running in guides 468 in the shielding block 469 which is supported from end plate 462 is the valve body 470. Slidably mounted on the underside of the valve body 470 is a shuttle 472 which is provided with an inclined cam path 474 engaged by a roller 476 mounted on the valve plate 478 which in turn is carried on vertical pins 480 secured in the top of the valve plate 478. Compression springs 482 on the pins 480 urge the valve plate 478 upwardly into the valve body 470. When the shuttle 472 is moved in relation to the valve body 470 the cam path 474 acts on the roller 476 to press the valve plate 478 down onto the adaptor flange 460 against the action of the springs 482 or allow it to rise under the action of the said springs. This relative movement is effected as follows. The valve body 470 is bored to receive a valve actuating rod 484 slidably mounted therein and carrying at its end the shuttle 472. A compression spring 486 on the valve rod 484 is disposed in the valve body 470 and engages a collar 488 on the valve rod 484. The spring urges the shuttle 472 to one extreme position. Lugs 490 formed on the valve body 470 engage stops 492 on the pressure vessel end plate 462. When the valve rod 484 is thrust inwardly the lugs 490 engage with the stops 492 and further movement of the valve rod 484 results in the shuttle 472 moving relatively to the valve body 470 and valve plate 478, thereby closing the valve.

Figure 21:
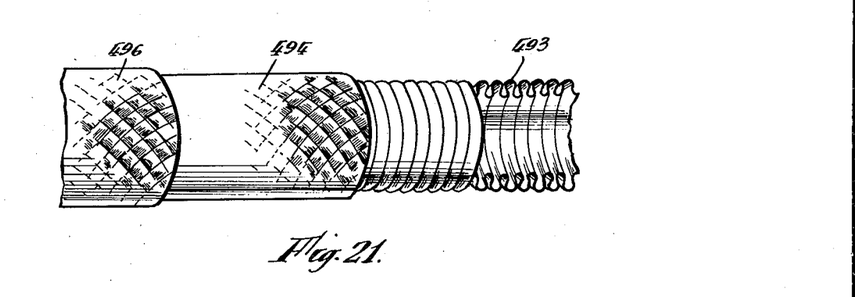
Fig. 21 is a longitudinal section through a short length of hollow flexible gastight element grab cable for use with the barrel shown in Fig. 17 instead of the electric cable shown in Fig. 7 with its associated slip ring device.

Turning now to Fig. 21. Shown here is a short length of flexible pressure hose which is composed of a thin walled corrugated seamless inner metal pipe 493 encased in two layers of metallic braid 494 and 496. The whole is made in a suitable non-corrosive metal such as stainless steel and the construction obviously gives gas tightness combined with adequate flexibility and the ability to carry a substantial load which of course is taken by the braiding. Said pressure hose is for use instead of an electric cable when a gas operated grab is substituted for an electrically operated grab.

The operation of the apparatus is substantially the same as with the construction described with reference to Figs. 1 to 6.

Figures 3, 4, 5:
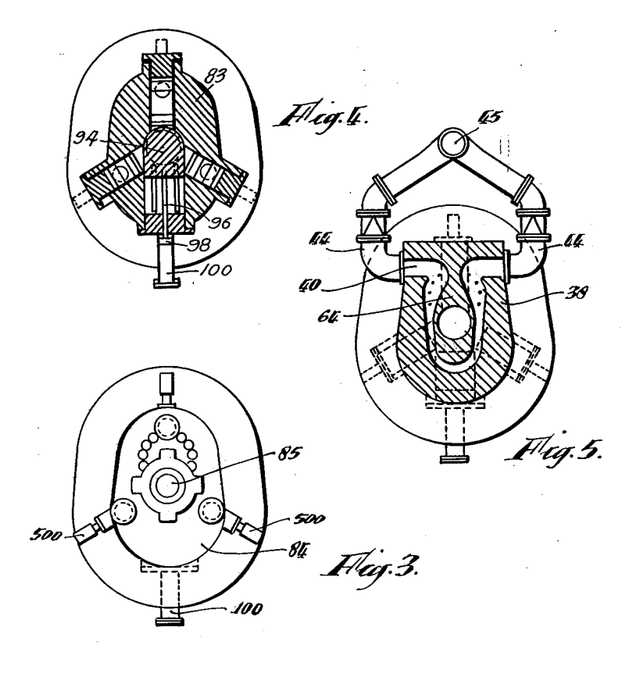
Fig. 3 is a transverse section on the line III—III of Fig. 1.
Fig. 4 is a transverse section on the line IV—IV of Fig. 1.
Fig. 5 is a similar section on the line V—V of Fig. 1.
Figure 6:
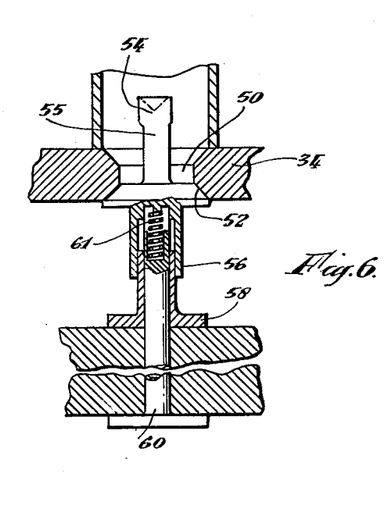
Fig. 6 is a detail view to an enlarged scale showing the valve arrangement at the base of a charge storage channel.
Figure 7:
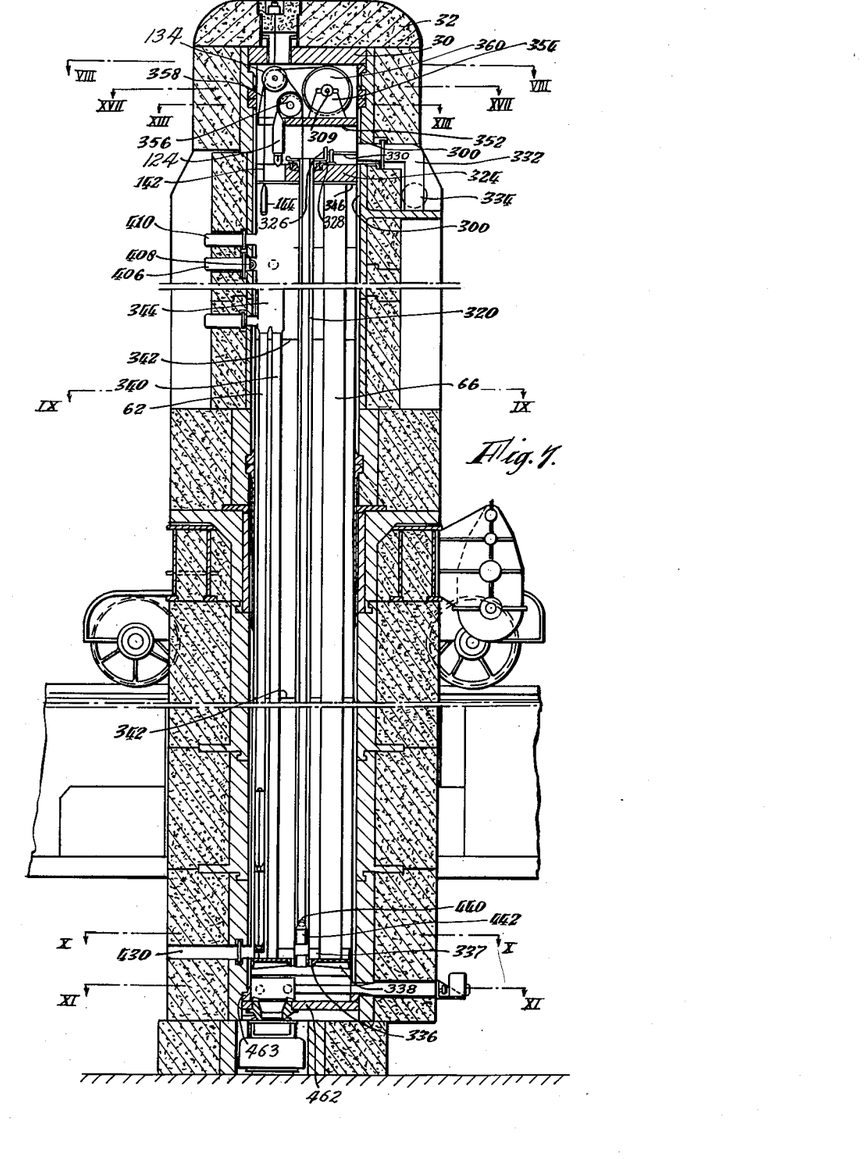
Fig. 7 is a longitudinal sectional elevation of a modified form of apparatus made in accordance with the present invention.
Figure 8:
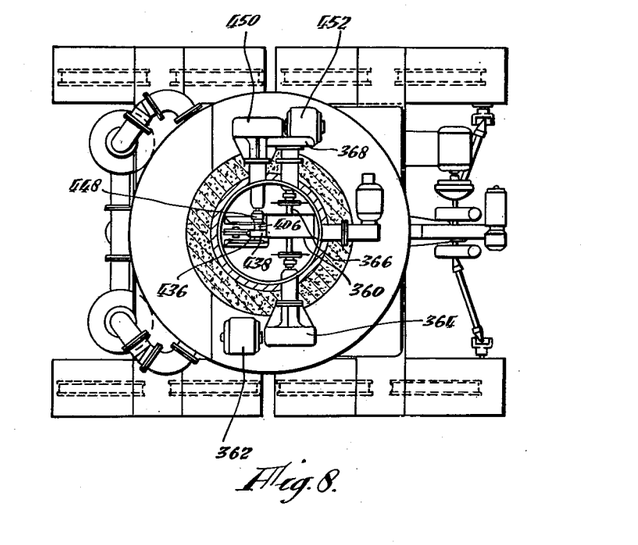
Fig. 8 is a section on the line VIII—VIII of Fig. 7 after some of the shielding had been removed.
Figure 9:
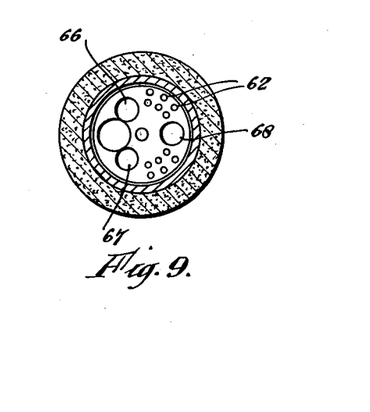
Fig. 9 is a section on the line IX—IX of Fig. 7.
Figure 10:
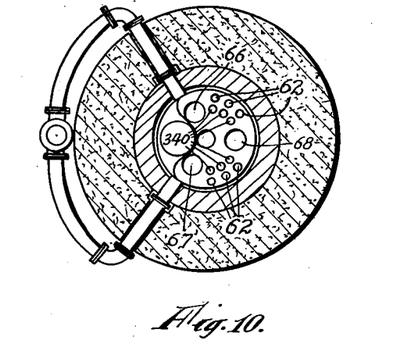
Fig. 10 is a section on the line X—X of Fig. 7, and it will be noted however that in this view and in Fig. 9 the turret carrying the tubes has been turned to leave the exit clear.
Figure 11:
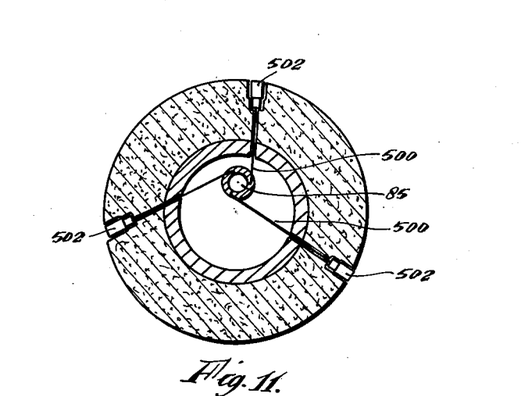
Fig. 11 is a section on the line XI—XI of Fig. 7.

Turning back to Fig. 11. This figure shows a modification of the observation means shown in Fig. 4 which is embodied in the arrangement shown in Fig. 7. Instead of using mirrors 496 and 498 in two planes, as shown in Fig. 4, to avoid a direct escape path for harmful rays from elements being extracted through tube 85, introscopes 500 arranged substantially tangentially to the tube 85 and projecting thereinto are disposed between television cameras 502 and the tube 85. Direct inspection can be obtained by removing the cameras 502.

What we claim and desire to secure by Letters Patent is:

1. Apparatus for charging and discharging a vessel, comprising a chamber adapted for movement to and from said vessel and having an outlet adapted to be coupled to said vessel, storage means in said chamber for the storing of a charging chute adapted for movement through said outlet between said chamber and said vessel and for the storing of charge material to be charged into or discharged from said vessel through said outlet, hoist means within said chamber provided with grab means for engaging and releasing said chute and said charge material, and control means for controlling said hoist means and said grab means.

2. Apparatus according to claim 1, wherein the chamber is gas-tight and pressurizable and is provided with valve means at its outlet.

3. Apparatus according to claim 1, wherein the storage means for the charge material includes receiving tubes arranged on a rotatable turret enabling alignment of said tubes with the chamber outlet.

4. Apparatus according to claim 1, wherein separate hoist means and grab means are provided within said chamber for engaging and releasing said chute and for engaging and releasing said charge material, and separate control means are provided for controlling said separate hoist and grab means.

5. Apparatus according to claim 4, wherein a portion of the wall of the chamber is removable, and at least one of the hoist means is mounted in said removable portion.

6. Apparatus according to claim 4, in which the two hoist means are adapted to operate on the same line of hoist, one of said hoist means being movable out of said line of hoist to a non-interfering position with respect to the other hoist means.

7. Apparatus according to claim 4, wherein the charging chute storage means is mounted on a rotatable turret enabling alignment of said storage means with the chamber outlet.

8. Apparatus according to claim 7, wherein the storage means for the charge material includes receiving tubes mounted on the rotatable turret enabling alignment of said tubes with the chamber outlet.

9. Apparatus according to claim 8, which includes charge material guide means associated with the charge material storage means and mounted on the turret, the charge material hoist means including a cable, and the apparatus, further, including means for displacing said cable to enable said charge material to be transferred between said charge material guide means and said charge material storage means.

10. Apparatus according to claim 4, wherein the charging chute hoist means and the charge material hoist means each include a cable at least one of which is out of alignment with said outlet and movable into alignment therewith.

11. Apparatus according to claim 4, wherein at least one of said hoist means includes a head pulley, a cable and a barrel for receiving said cable as a winding thereon, said apparatus including means for moving said barrel axially during rotation thereof, whereby to maintain said cable, between said barrel and said pulley, substantially in alignment with the latter.

12. Apparatus for charging and discharging a vessel, comprising a gas-tight, pressurizable chamber adapted for movement to and from said vessel and having an outlet adapted to be coupled to said vessel, valve means at said outlet, storage means in said chamber for a charging chute adapted to be inserted into and removed from said vessel through said outlet and for the charging therethrough of charge material into and from said vessel, and storage means in said chamber for charge material to be thus charged into and discharged from said vessel through said chute, and independent hoist means in said chamber each provided with a grab for engaging and releasing said chute and said charge material respectively, and control means for controlling said hoist means and said grabs.

13. Apparatus according to claim 12, wherein each of the independent hoist means includes a cable adapted to operate on the same line of hoist, one of said hoist means being movable out of said line of hoist to a non-interfering position in relation to the other hoist means.

14. Apparatus according to claim 12, wherein each of the independent hoist means includes a cable, the cable of at least one of said hoist means being out of alignment with the outlet, and said apparatus including means for aligning said one cable with said outlet.

15. Apparatus according to claim 12, wherein the charging chute storage means is mounted on a rotatable turret for bringing said chute storage means into alignment with said chamber outlet.

16. Apparatus according to claim 12, in which the charge material storage means includes receiving tubes mounted on a rotatable turret for bringing said tubes into alignment with the chamber outlet.

17. Apparatus according to claim 16, in which the charging chute storage means is also mounted on the turret so as to be alignable with the chamber outlet.

18. Apparatus according to claim 16, which includes guide means associated with the charge material storage means and mounted on the turret, said hoist means for the charge material including a cable, and said apparatus including means for displacing the latter cable to enable the latter hoist means to transfer charge material between said storage means and said guide means.

19. Apparatus according to claim 12, wherein one of said hoist means includes a head pulley, a cable and a barrel for receiving said cable as a winding thereon, said apparatus including means for moving said barrel axially during rotation thereof, whereby to maintain said cable, between said barrel and said pulley, substantially in alignment with the latter.

20. Apparatus according to claim 12, wherein at least one portion of the wall of the chamber is removable and one of the hoist means is mounted in said wall portion.

References Cited in the file of this patent
UNITED STATES PATENTS

| | | |
|---|---|---|
| 1,514,079 | Gehnrich | Nov. 4, 1924 |
| 2,172,386 | Huff | Sept. 12, 1939 |
| 2,863,815 | Moore | Dec. 9, 1958 |

OTHER REFERENCES

Methods of Refueling Heterogeneous Nuclear Reactors.

Problems in Nuclear Engineering, vol. I, Permogon Press, 1957.

The Experimental Development of a Fuel Handling System for the Sodium Reactor Experiment, NAA–SR–2004 Reactors–Power.